(12) United States Patent  
Moore

(10) Patent No.: US 6,719,555 B2
(45) Date of Patent: Apr. 13, 2004

(54) APPARATUS FOR MAKING PIPE INSULATION

(75) Inventor: Geoffrey H. Moore, Bright's Grove (CA)

(73) Assignee: Fibrex Insulations, Inc., Sarnia (CA)

( * ) Notice: Subject to any disclaimer, the term of this patent is extended or adjusted under 35 U.S.C. 154(b) by 107 days.

(21) Appl. No.: 10/010,042

(22) Filed: Dec. 6, 2001

(65) Prior Publication Data

US 2002/0048616 A1 Apr. 25, 2002

Related U.S. Application Data

(62) Division of application No. 09/413,016, filed on Oct. 7, 1999, now Pat. No. 6,364,649.

(51) Int. Cl.[7] ............................................... B29C 53/00
(52) U.S. Cl. ...................... 425/363; 425/388; 425/393; 425/405.1; 425/471
(58) Field of Search ........................... 425/85, 223, 363, 425/388, 342, 393, 405.1, 471, DIG. 60

(56) References Cited

U.S. PATENT DOCUMENTS

| 30,064 | A | 9/1860 | Hemminway |
|---|---|---|---|
| 540,649 | A | 6/1895 | Eastwood |
| 612,971 | A | 10/1898 | Lee |
| 1,064,741 | A | 6/1913 | Jones |
| 1,285,375 | A | 11/1918 | Prokop |
| 1,428,119 | A | 9/1922 | Rogers |
| 1,870,954 | A | 8/1932 | Guenther et al. |
| 1,883,401 | A | 10/1932 | Rolfs et al. |
| 2,294,277 | A | 8/1942 | Cann |
| 2,360,592 | A | 10/1944 | Solanko |
| 2,558,055 | A | 6/1951 | Meredith |
| 3,118,800 | A | 1/1964 | Snelling |
| 3,344,009 | A | 9/1967 | Levecque |
| 4,178,200 | A | 12/1979 | Hakert et al. |
| 4,347,090 | A | 8/1982 | Anderson et al. |
| 4,954,060 | A | * 9/1990 | Hsu ............................ 425/85 |
| 5,091,037 | A | 2/1992 | Soikkeli |
| 5,155,889 | A | 10/1992 | Soikkeli |
| 5,225,016 | A | 7/1993 | Sarh |
| 5,261,980 | A | 11/1993 | Pearce |
| 5,346,149 | A | 9/1994 | Cobb |
| 5,452,496 | A | 9/1995 | Long et al. |
| 5,569,343 | A | 10/1996 | Garrigus |

FOREIGN PATENT DOCUMENTS

| CA | 1323558 | 10/1993 |
|---|---|---|
| CA | 1325958 | 1/1994 |

* cited by examiner

Primary Examiner—James P. Mackey
Assistant Examiner—Donald Heckenberg
(74) Attorney, Agent, or Firm—Leydig, Voit & Mayer, Ltd.

(57) ABSTRACT

A roll forming apparatus used for rolling a material around a cylindrical core that comprises a core support, a roll support means, and a material supply means. The core support has an associated core rotation means for rotating the core about an axis at a controllable rate. The roll support means supports a plurality of forming rolls positioned to surround the core about the core rotation axis. The roll support means has a roll control means operable to both radially position the plurality of forming rolls relative to the core rotation axis so that they are equally spaced from the rotation axis. The material supply means is for supplying the selected material to the core at a material supply rate, and has an associated material supply control means for controlling the material supply rate.

10 Claims, 15 Drawing Sheets

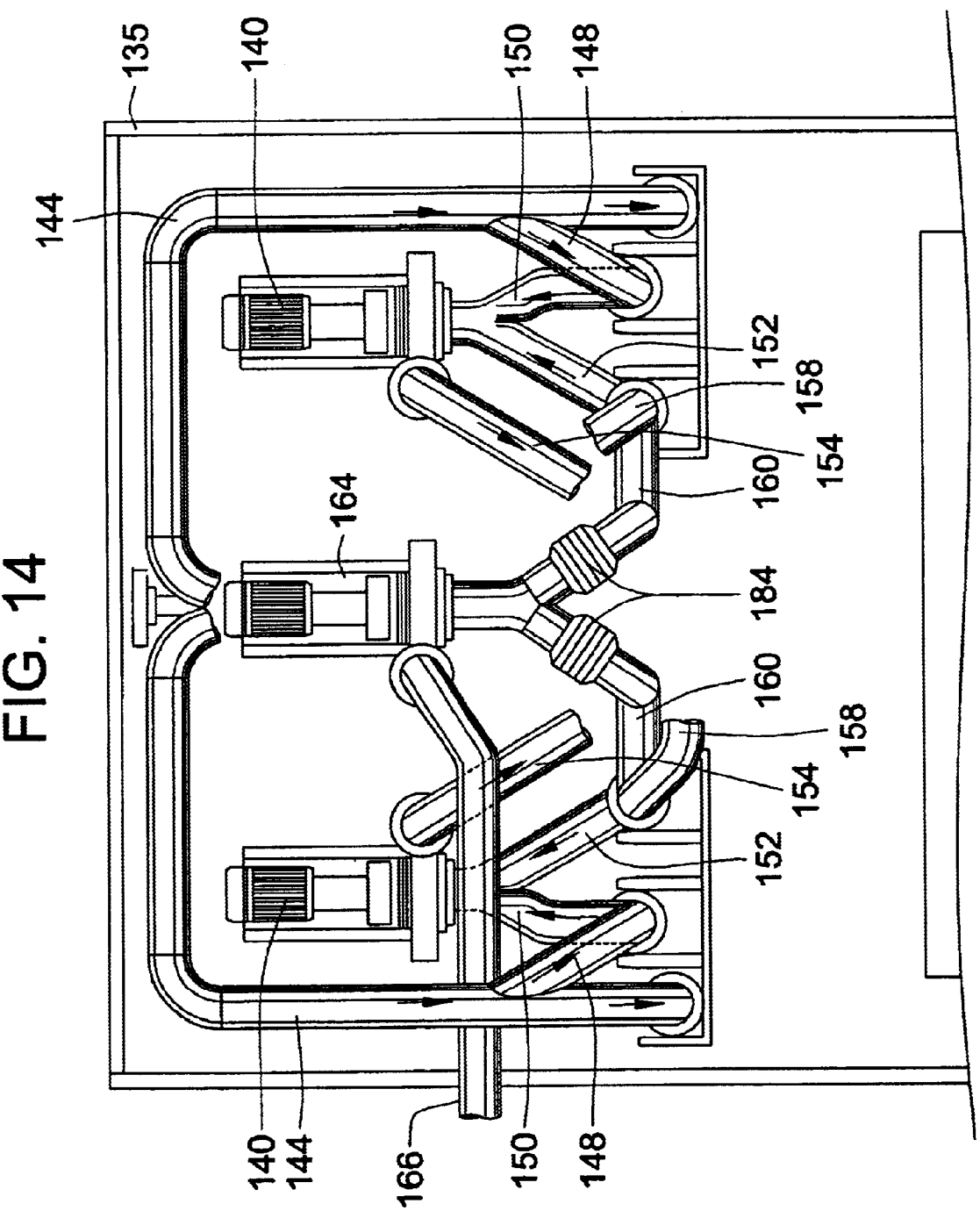

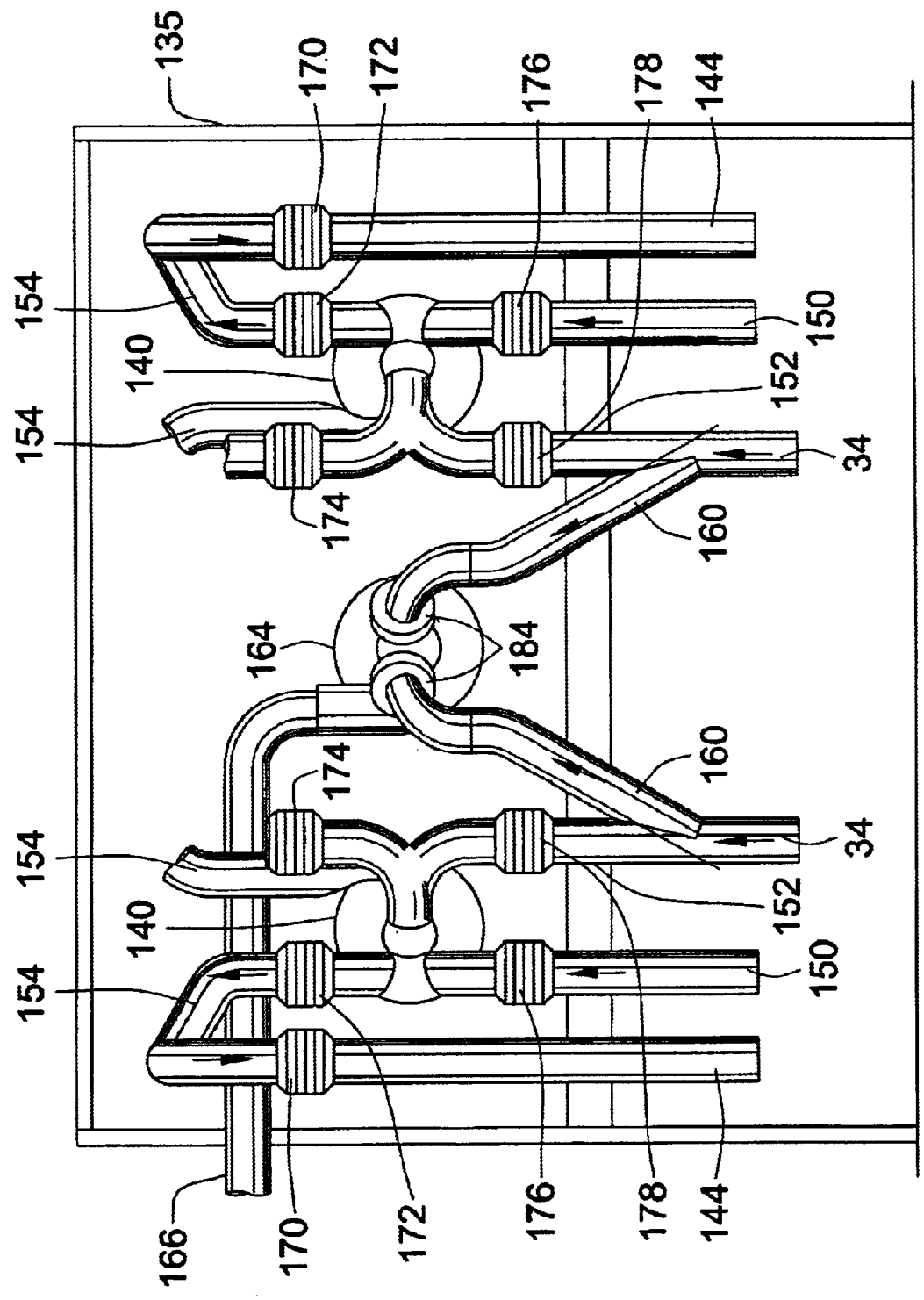

APPARATUS FOR MAKING PIPE INSULATION

CROSS REFERENCE TO RELATED APPLICATION

Figure 1:
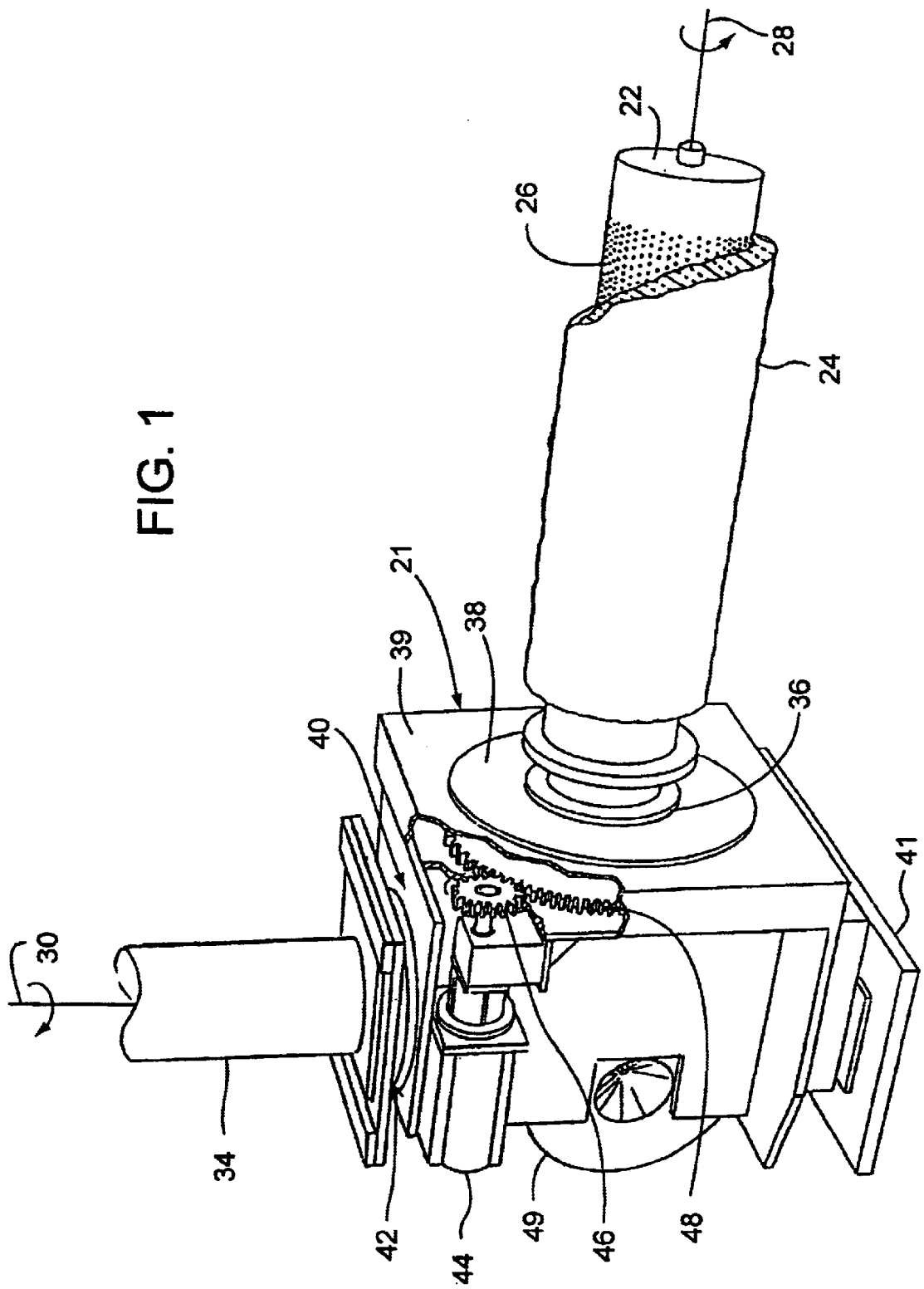

This application is a divisional of application Ser. No. 09/413,016, filed Oct. 7, 1999, now U.S. Pat. No. 6,364,649.

FIELD OF THE INVENTION

This invention relates to manufacturing pipe insulation and more particularly to an apparatus and method for making pipe insulation.

BACKGROUND OF THE INVENTION

In order to manufacture a cylindrical insulation product suitable for insulating pipes, an insulating material such as mineral fibre is first formed into a cylindrical shape. After the insulation product has been formed, it is typically hardened in this shape by curing. After curing, it may be necessary or desirable to sand the exterior of the hardened cylindrical product in order to provide a regular, smooth exterior.

U.S. Pat. No. 3,344,009 (Levecque) discloses an apparatus for forming hollow cylinders of resin-impregnated mineral mats suitable for use as insulation for systems of pipes or conduits. The apparatus includes a mandrel about which the mat is wrapped. The winding of the mat on the mandrel is executed pneumatically, in that the hollow mandrel has perforations on its surface, and the interior of the mandrel is placed under reduced pressure. After the mat has been formed on the mandrel, it is ejected therefrom and travels through a heating compartment that heats the mat to a sufficient temperature and for a sufficient period of time to cure the mat.

Prior apparatus such as that disclosed by Levecque may suffer from a number of disadvantages. Typically, the mineral fibre used for insulation is somewhat resilient. If, as is typically the case, the mineral fibre is no longer subjected to compression after forming, then there may be some expansion of the compressed mineral fibre before curing. The expanded mineral fibre will then be cured, resulting in an insulation product that may be of lower density than desired. Further, it is very desirable that the insulation product have a hard and smooth inside core as well as uniform wall thickness and outside diameter, as this greatly facilitates fitting the insulation on pipes. The concentricity and outside diameter are as important as the inside diameter of the pipe since segments are cut and rotated 180 degrees to form segmented elbows; if the insulation product is not concentric or the outside diameter changes, then the inside diameter of each segment will not line up. Typically, however, the insulation is removed from the forming mandrel before being fully cured. Accordingly, some of the expansion, which may well be uneven, may occur on the inner surface of the insulation product as well as the outer surface of the insulation product, resulting in a cured inside core that is less hard and smooth than the core was at the end of the forming stage of manufacture. The insulation product may also differ in thickness at different points along its length as a result of differential expansion.

Prior apparatus for winding insulating ply around a cylindrical core have been devised. U.S. Pat. No. 5,143,314 (Soikkeli), issued on Sep. 1992, discloses such a prior apparatus in which an insulating material is wound around the core and a movable endless belt is bent around both the core and the insulating material in order to compress and form the insulating material around the core.

Prior art apparatus such as the Soikkeli apparatus may suffer from a number of disadvantages. For example, the movable endless belt used by Soikkeli to hold and compress the insulating material next to the core may not provide equal pressure on the insulating material all the way around the core. Indeed, at some points, the mineral fibre may not be contacted by the endless belt at all, resulting in uneven thickness and density of the insulation material after forming. Further, in the Soikkeli apparatus the forming radius provided by the endless belt cannot be separately controlled; instead this forming radius is determined by the tension in the endless belt and the resistance of the insulation product to compression. This, in turn, may make it more difficult to produce high tolerance insulation product, especially when forming low density outer layers of insulation. High tolerance insulation product is desirable for, among other applications, fabricating segmented sections of insulation to fit curved pipe.

Thus, a method and apparatus for manufacturing pipe insulation in which the insulation is kept on the mandrel or core throughout both the curing stage and the forming stage, and in which the desired shape and density of the insulation product can be retained throughout the forming stage and the curing stage, is desirable. Preferably, the apparatus for manufacturing pipe insulation would include a roll forming apparatus that provides substantially uniform compression to all exposed portions of the insulating material around its circumference. It is also desirable that the rolling apparatus be easily and precisely adjustable to accommodate changes in the diameter of the insulating material and core. In order to integrate the forming of the insulation product with subsequent stages of manufacture, such as curing and sanding, it is desirable that the core with the formed insulating material wrapped thereround be easily transportable to the subsequent curing stage.

SUMMARY OF THE INVENTION

An object of an aspect of the present invention is to provide an improved insulation manufacturing apparatus.

In accordance with this aspect of the present invention there is provided a roll forming apparatus for rolling a selected material around a cylindrical core. The apparatus comprises a core support, a roll support means, and a material supply means. The core support is for supporting the cylindrical core. The core support has an associated core rotation means for rotating the core about a core rotation axis at a controllable rotation rate. The roll support means supports a plurality of forming rolls positioned to surround the core about the core rotation axis. The roll support means has a roll control means operable to both radially position the plurality of forming rolls relative to the core rotation axis and to constrain the plurality of forming rolls to be equally spaced from the core rotation axis, in order to provide integrated adjustment of the plurality of forming rolls to control a radial dimension of a substantially symmetrical forming space defined by the plurality of forming rolls. The material supply means is for supplying the selected material to the core at a material supply rate, and has an associated material supply control means for controlling the material supply rate.

In accordance with another aspect of the present invention there is provided an apparatus for receiving a selected curable material and for retaining the selected curable material during a forming stage and a curing stage. The selected curable material is formed into a desired configuration during the forming stage, and is heated during the curing stage to harden the selected material in the desired configuration. The apparatus includes a core mounted for rotation about an axis of rotation, a curing means for heating the selected curable material to at least a curing temperature to harden the selected curable material in the selected configuration, and a vacuum means in fluid communication with the fluid communication means. The core has an associated core rotation means for rotating the core about an axis of rotation, an outer permeable surface for receiving and retaining the selected curable material, and a fluid communication means for receiving air flow from the outer permeable surface. The vacuum means is operable to draw a forming core air flow through the fluid communication means, the outer permeable surface of the core and the selected curable material retained on the core during forming of the selected curable material retained on the core. The forming core air flow has a temperature below the curing temperature. The vacuum means is also operable to draw a curing core air flow through the outer permeable surface and the fluid communication means of the core and the selected curable material retained on the core during curing of the selected curable material retained on the core.

An object of another aspect of the present invention is to provide an improved insulation manufacturing method.

In accordance with this aspect of the present invention there is provided a method of forming and curing a selected curable material in a desired configuration. The method comprises the steps of (a) supplying the selected curable material to the core, (b) forming the selected curable material retained on the core, and (c) curing the selected curable material retained on the core. During steps (a), (b) and (c), the method also comprises drawing a core air flow through a permeable surface of a core and through the selected curable material on the core to retain the selected curable material on the core and to compress the selected permeable material to the core. The core air flow has an air temperature below a curing temperature of the selected curable material during steps (a) and (b).

A BRIEF DESCRIPTION OF THE DRAWINGS

Figure 2:
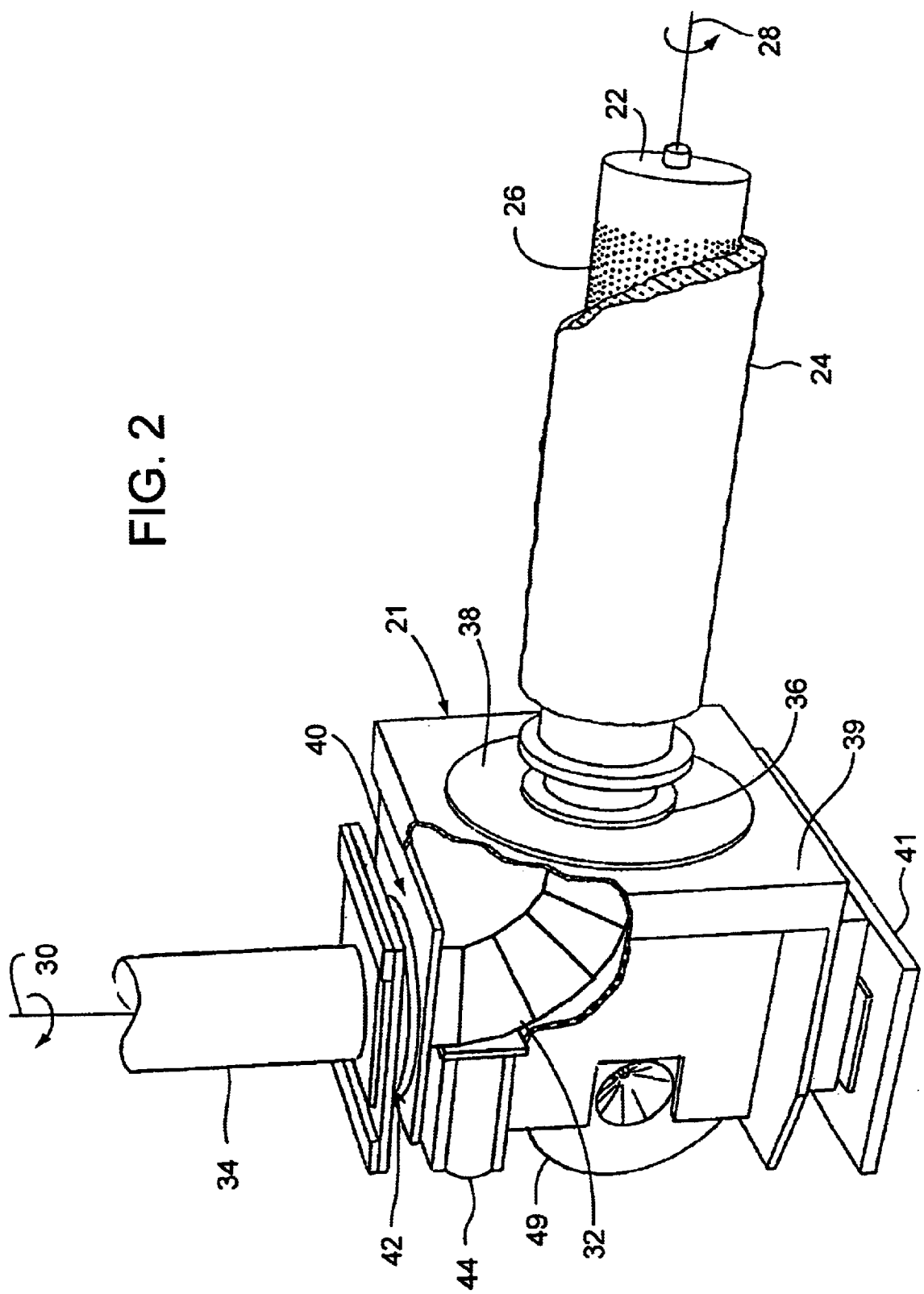
Figure 3:
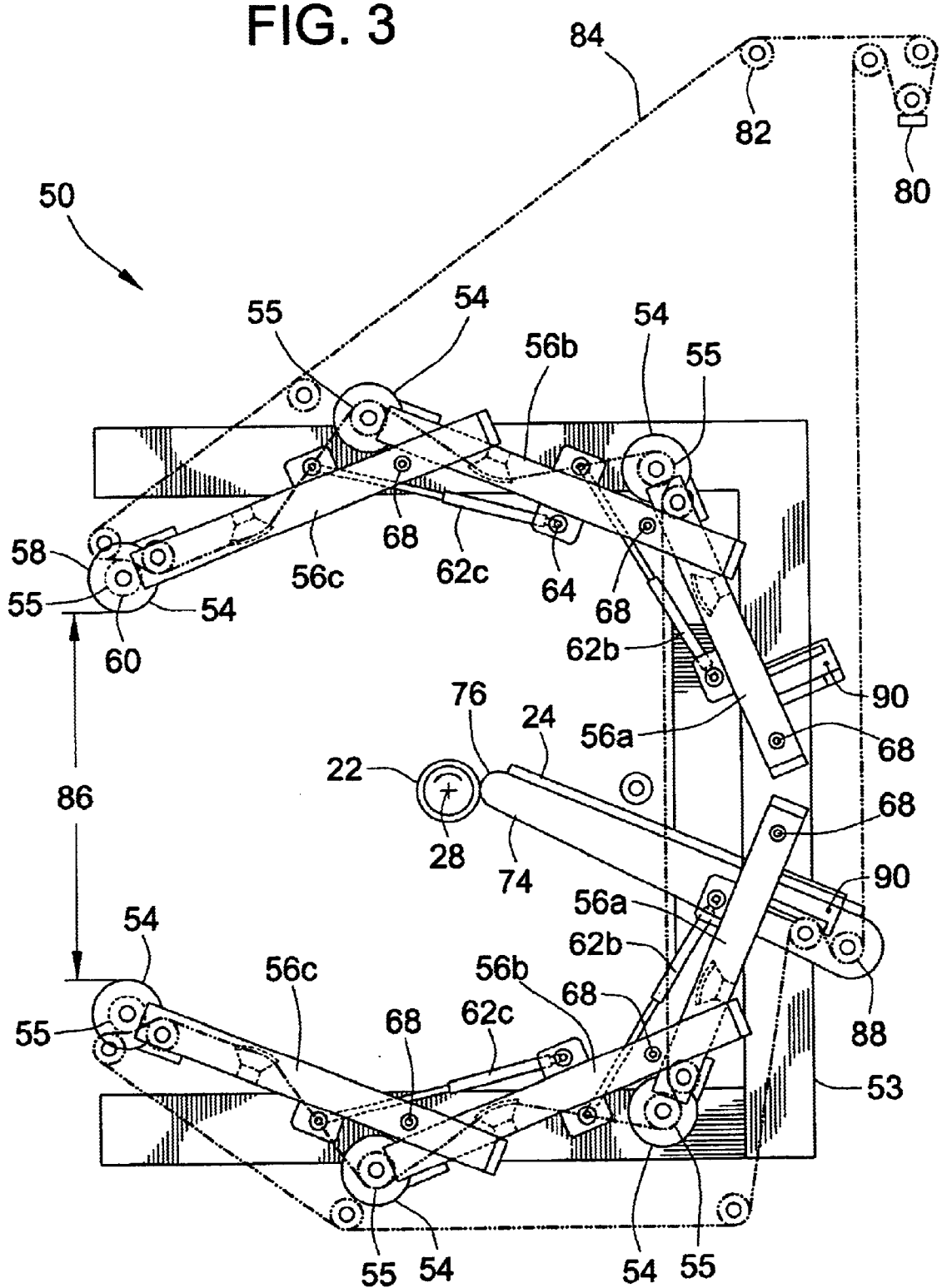
Figure 4:
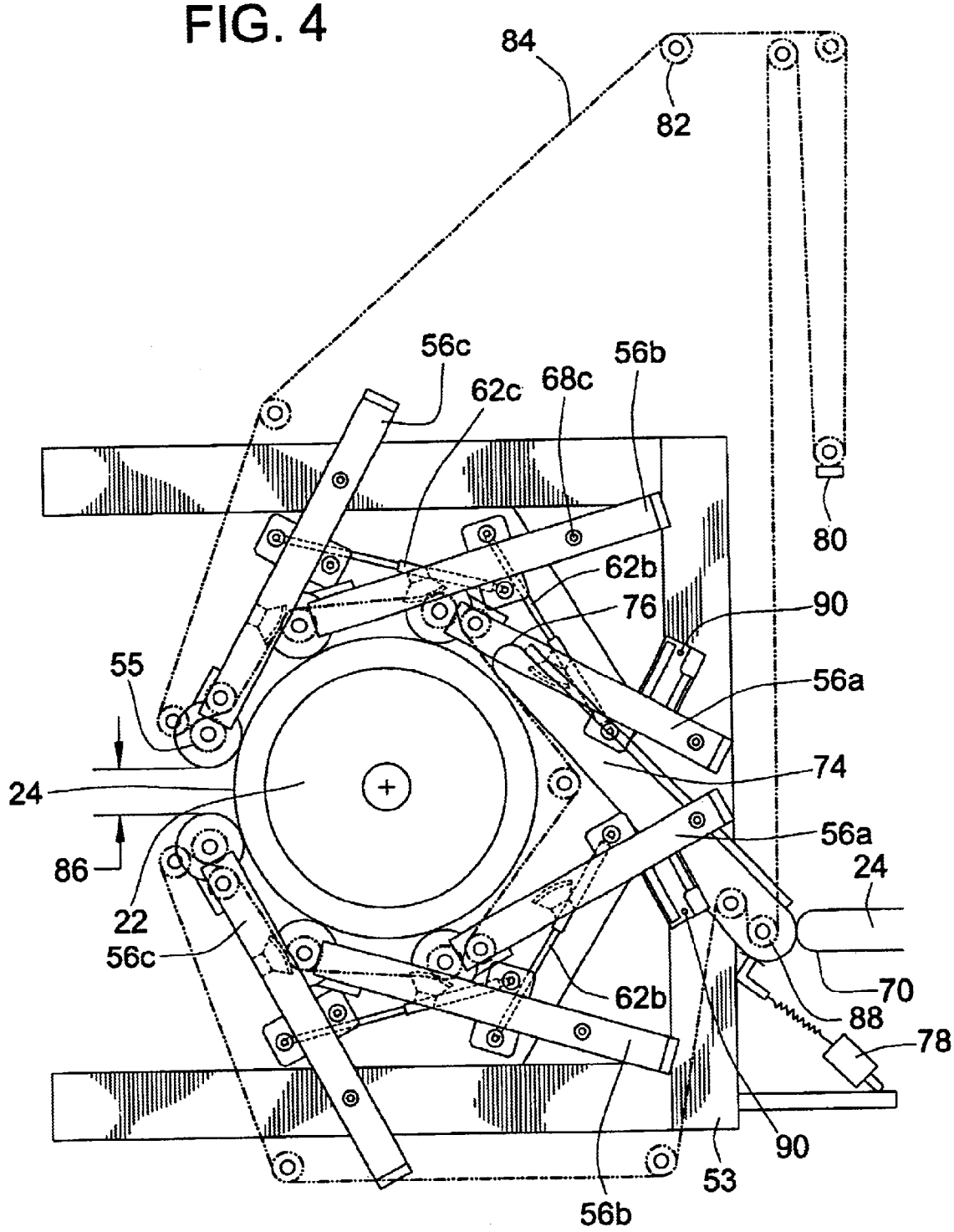
Figure 5:
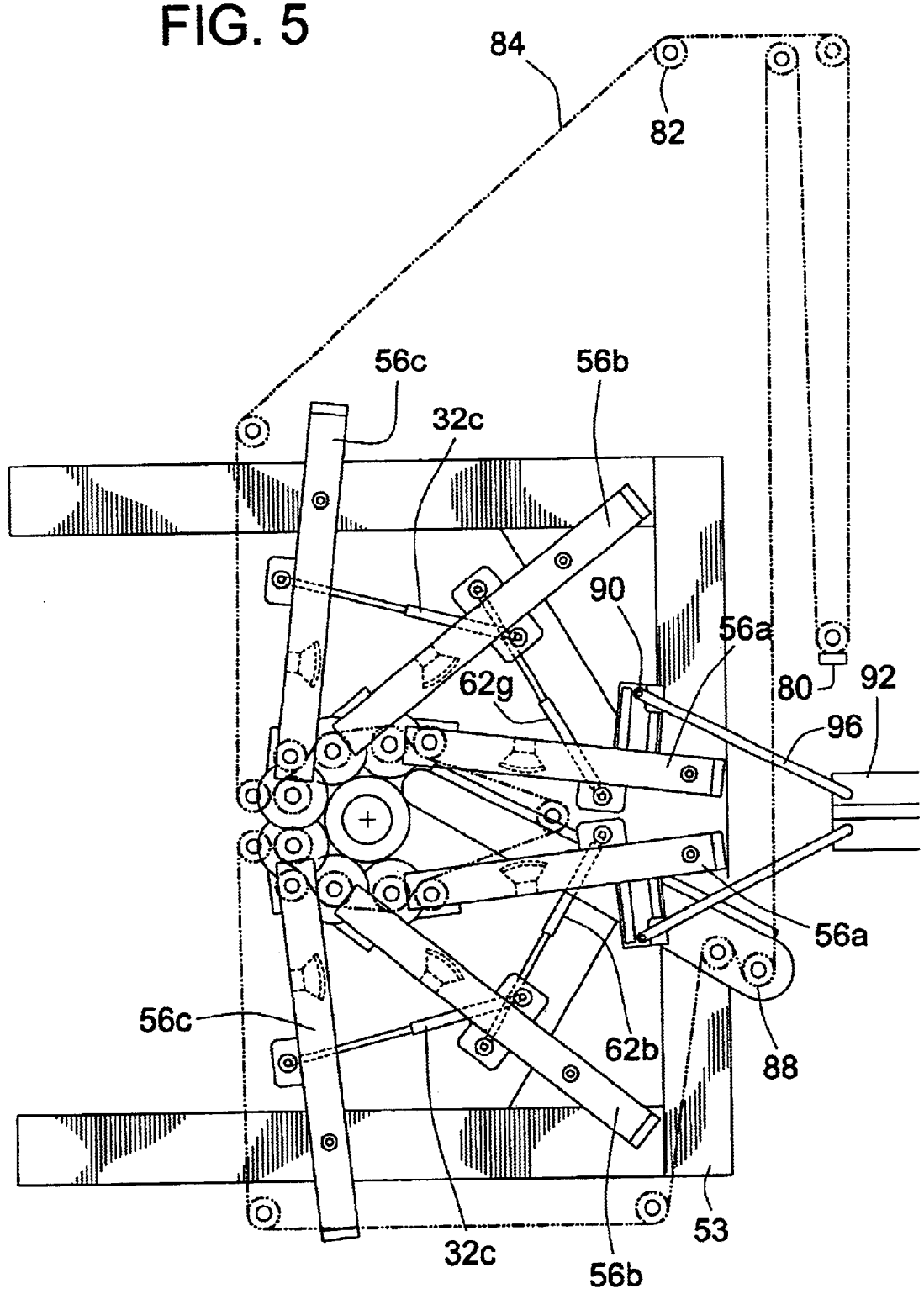
Figure 6:
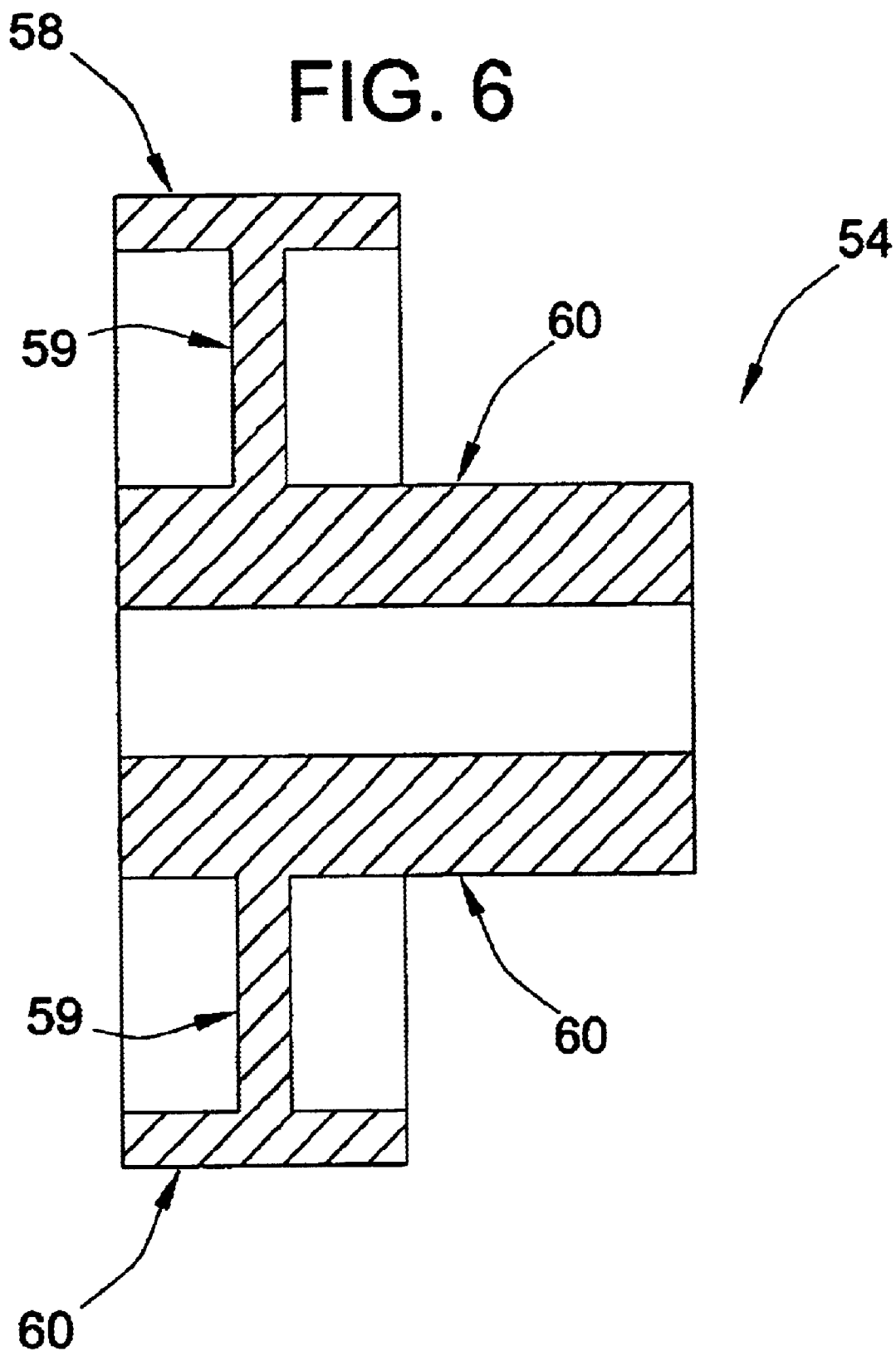
Figure 7:
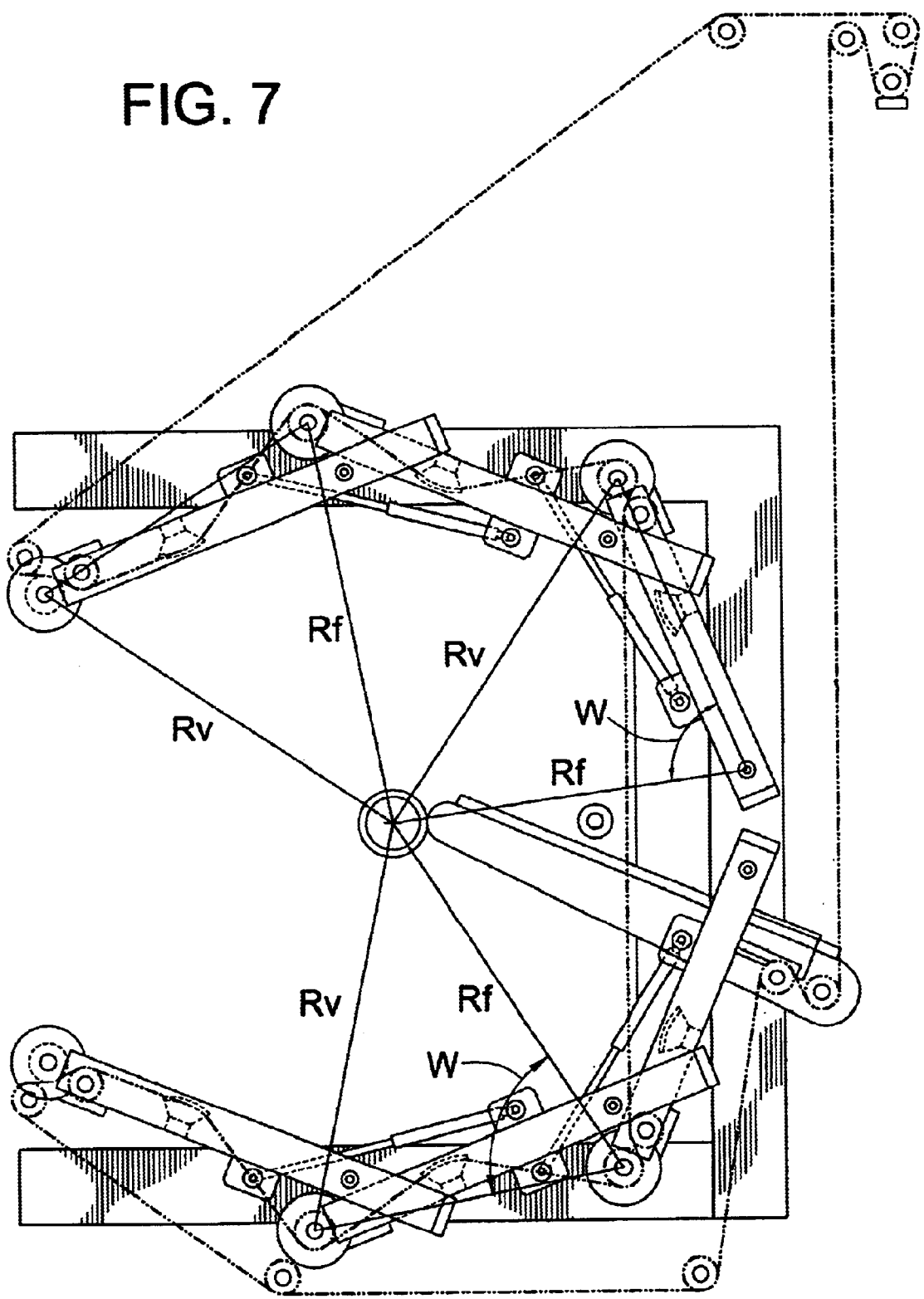
Figure 8:
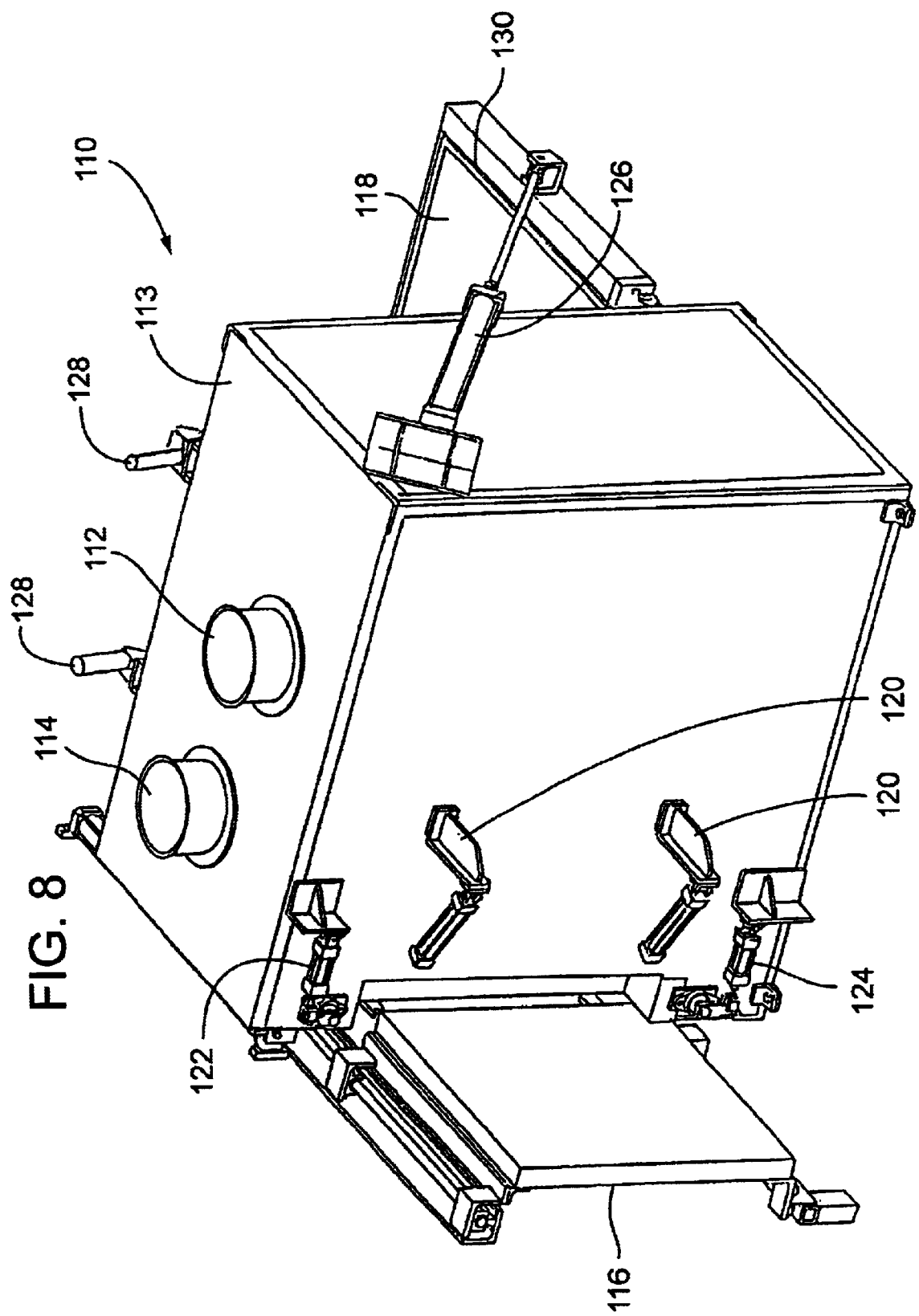
Figure 9:
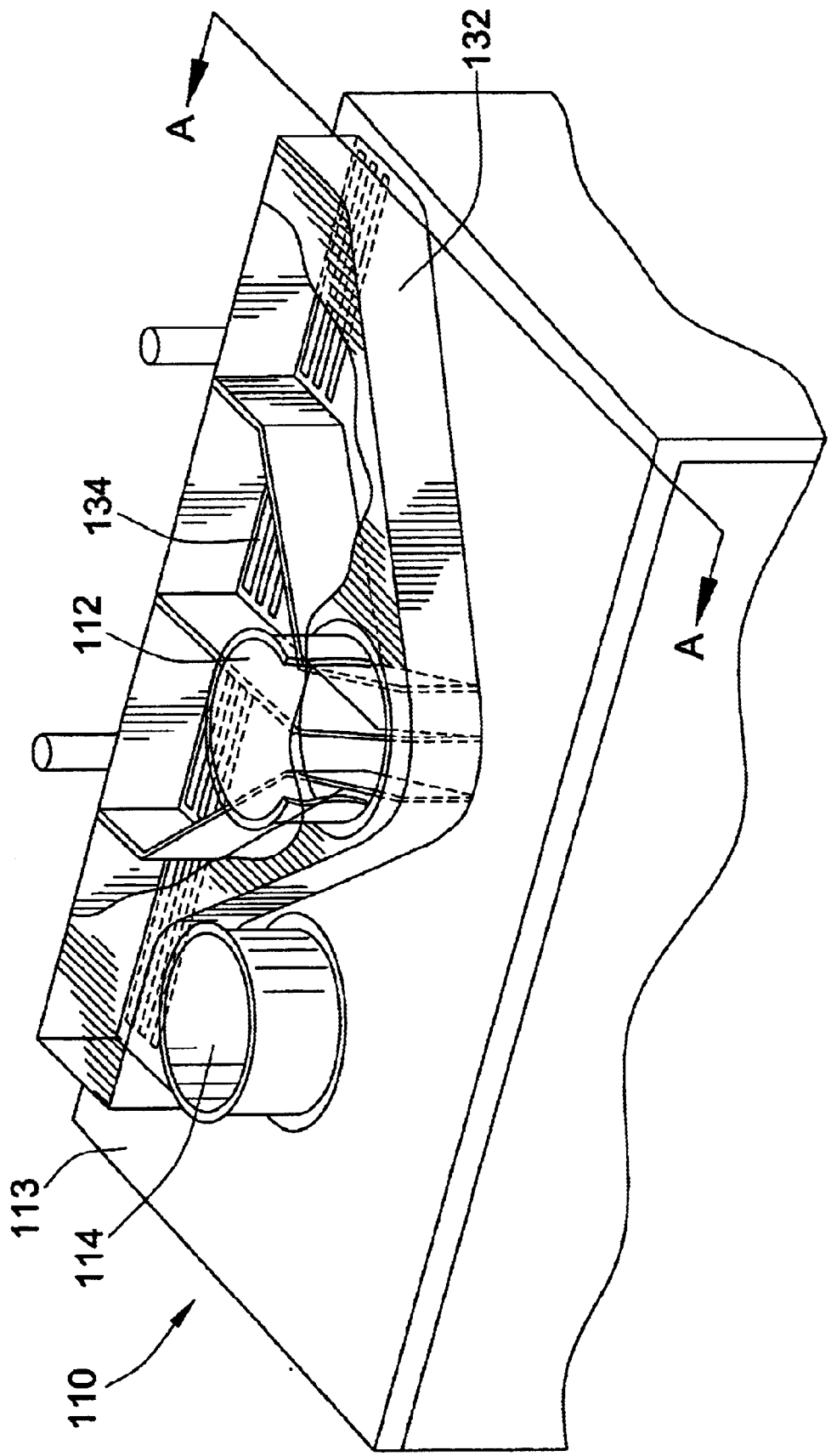
Figure 10:
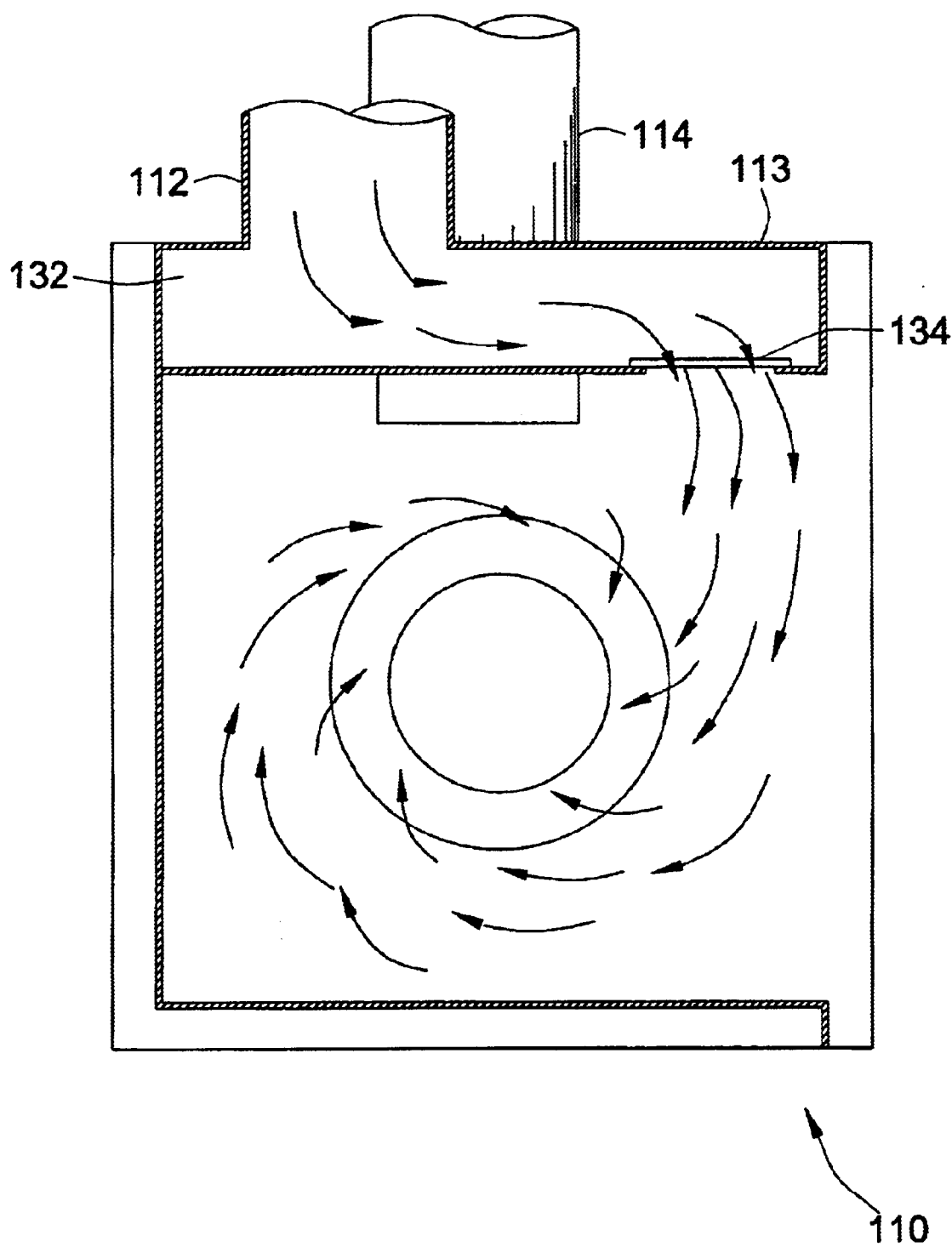
Figure 11:
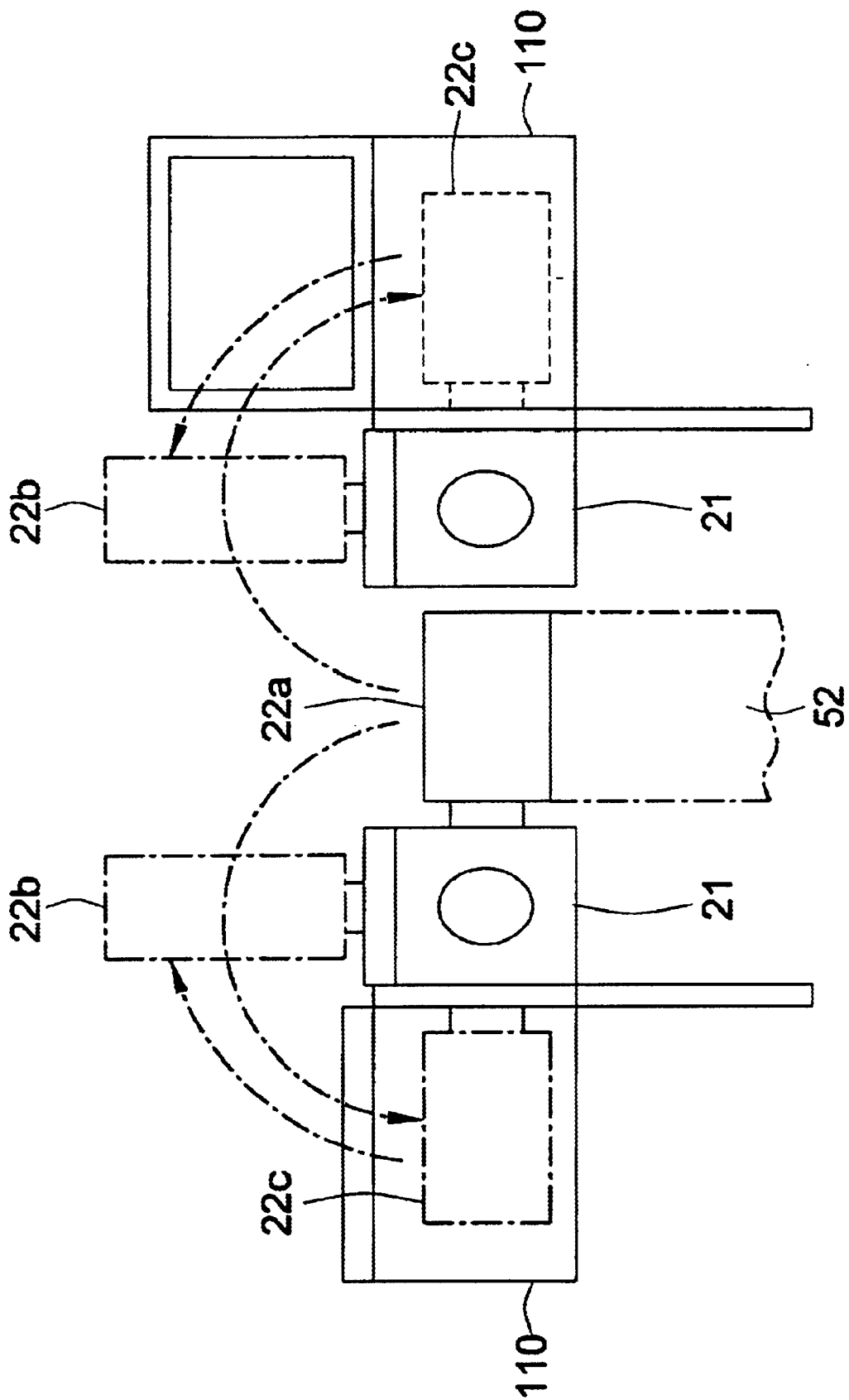

A detailed description of the preferred embodiments of the invention is provided herein below with reference to the following drawings, in which:

FIG. 1 in a perspective view illustrates a vacuum core and a core support of an insulation making apparatus in accordance with a preferred embodiment of the present invention;

FIG. 2 in a perspective view illustrates the vacuum core and the core support of the insulation making apparatus of FIG. 1 in which the core support has been partially cut-away to show a vacuum duct;

FIG. 3, in a sectional view, illustrates a roll forming apparatus of an insulation making apparatus in accordance with a preferred embodiment of the present invention;

FIG. 4, in a sectional view, illustrates the roll forming apparatus of FIG. 3 wherein the apparatus has been adjusted to roll a core wrapped with insulating material;

FIG. 5, in a sectional view, illustrates, the roll forming apparatus of FIG. 3 in which the apparatus has been adjusted to roll a core with insulating material of small diameter;

FIG. 6, in a sectional view, illustrates a forming roll of the roll forming apparatus of FIG. 3;

FIG. 7, in a sectional view, illustrates the geometry of the roll forming apparatus of FIG. 3;

FIG. 8 in a perspective view illustrates a curing oven of the insulation making apparatus of FIG. 1;

FIG. 9 in a cut-away perspective view illustrates the curing oven of FIG. 8;

FIG. 10 in a sectional view of FIG. 9, illustrates the curing oven of FIGS. 8 and 9;

FIG. 11, in a plan view, illustrates a preferred layout of the pipe insulation making apparatus in accordance with a preferred embodiment of the invention; and FIGS. 12 to 15, in different cut-away plan views, illustrate different portions of a duct network connected to the vacuum core of FIG. 1 and the curing oven of FIG. 8.

DETAILED DESCRIPTION OF THE PREFERRED EMBODIMENTS OF THE INVENTION

Referring to FIG. 1, there is illustrated in a perspective view a core support 21 and a core 22 of a pipe insulation making apparatus in accordance with a preferred embodiment of the present invention. The core 22 is supported by the core support 21 at a horizontal swivel joint 38. The horizontal swivel joint 38 supports the core 22 at an elevated and generally horizontal orientation, while permitting rotation of the core 22 about an axis of rotation 28. The core support 21 includes a rotary drive 44 having a drive pinion 46. In operation, the rotary drive 44 rotates the drive pinion 46, which, in turn, rotates the core gear-ring 48 and the core 22.

In operation, mineral fibre or other selected curable material 24 is supplied to the core 22 by any suitable means such as a conveyor. While the selected curable material 24 is being supplied to the core 22, the core 22 rotates around the axis of rotation 28 thereby wrapping the selected curable material 24 around the core 22. The core 22 is partially hollow, and a partial vacuum is maintained in the interior of the core 22 in order to provide suction through perforations 26 in the surface of the core 22. Suction provided via the perforations 26 helps to hold the selected curable material 24 on the core 22.

Referring to FIG. 2, there is illustrated the core 22 and the core support 21 of FIG. 1; the core support 21 as shown in FIG. 2 has been partially cut-away to reveal a vacuum duct 32. Vacuum duct 32 is connected to the interior of core 22 at the horizontal swivel joint 38. The connection of the vacuum duct 32 and the interior of the core 22 is sealed at the horizontal swivel joint 38 by a horizontal end seal 36 in order to maintain the partial vacuum in the interior of the core 22 while permitting rotation of the core 22 relative to the vacuum duct 32. Vacuum duct 32 is, in turn, connected to a vacuum exhaust duct 34. The partial vacuum inside the vacuum duct 32 and the core 22 is maintained by a partial vacuum in vacuum exhaust duct 34. Vacuum exhaust duct 34 and vacuum duct 32 are of relatively large diameter and have relatively smooth inside walls in order to minimize any pressure drop and provide optimal suction to the perforations 26 of core 22.

Core support 21 is mounted on a support platform 41 for pivoting about pivot axis 30. Vacuum exhaust duct 34 is connected to core support 21 by a vertical swivel joint 42 and the vacuum exhaust duct 34 does not pivot with core support 21. The connection of the vacuum duct 32 and the vacuum exhaust duct 34 is maintained and sealed at the vertical swivel joint 42 by vertical end seal 40 in order to maintain the partial vacuum in the vacuum duct 32 while permitting the vacuum duct 32 to turn relative to the vacuum exhaust duct 34.

Referring to FIG. 3, there is illustrated in a sectional view a roll forming apparatus 50 of a pipe insulation making apparatus in accordance with a preferred embodiment of the present invention. The roll forming apparatus 50 comprises forming rolls 54, support arms 56, support arm pivot pins 68, and a roll forming apparatus frame 53. The roll forming apparatus 50 surrounds a core 22 that is mounted for rotation about an axis of rotation 28. Each support arm 56 is pivotably secured to the roll forming apparatus frame 53 by a unique one of the support arm pivot pins 68. Each of the support arm pivot pins 68 is fixed to the roll forming apparatus frame 53 at a common fixed radial distance, shown as $R_f$ in FIG. 7, from the axis of rotation 28. Each support arm 56 supports a single forming roll 54 spaced a common fixed arm distance, shown as $D_f$ in FIG. 7, from the support arm pivot pin 68 for such support arm 56. The support arms 56 may pivot about their respective support arm pivot pins 68 to change the spacing of the forming rolls 54 from the axis of rotation 28.

The rotation arms 56 include two proximal support arms 56a, two intermediate support arms 56b and two distal support arms 56c. Each proximal support arm 56a is adjacent to a different intermediate support arm 56b, which intermediate support arm 56b, is, in turn, adjacent to a different distal support arm 56c. Accordingly, the support arms 56 can be divided into two groups of adjacent support arms 56, each group comprising a proximal support arm 56a, an intermediate support arm 56b and a distal support arm 56c. The roll forming apparatus 50 includes a plurality of rod linkages 62; each rod linkage links adjacent support arms 56 within a group such that the support arms 56 in a group are constrained to pivot together by equal amounts about their respective support arm pivot pins 68. Specifically, within each group the distal support arm 56c is linked by an associated rod linkage 62c to the intermediate support arm 56b, and the intermediate support arm 56b is linked by an associated rod linkage 62b to the proximal support arm 56a.

The roll forming apparatus 50 includes two support arm drivers 90, each of which is linked to a different proximal support arm 56a. The support arm drivers 90 are operable to pivot the proximal support arms 56a about their respective support arm pivot pins 68. Turning to FIG. 5, each of the support arm drivers 90 is linked to a slide block 92 by a separate one of two driver linkages 96. The slide block 92 is driven by a servo-driven ball screw (not shown). The servo-driven ball screw moves the slide block 92, thereby moving the drive linkages 96 together, and operating the support arm drivers 90 together to pivot the proximal support arms 56a together by equal amounts about their respective support arm pivot pins 68.

As stated above, each support arm pivot pin 68 is spaced by the common fixed radial distance $R_f$ from the axis of rotation 28. Each support arm 56 forms a common angle W, shown in FIG. 7, with a line taken along the common fixed radial distance $R_f$ separating the associated support arm pivot pin 68 for such support arm 56 from the axis of rotation 28. The common angle W is common to all the support arms 56 because the two support arm drivers constrain the proximal support arms 56a to be oriented at the common angle W, and the rod linkages 62 constrain the remaining support arms to be at the common angle W. The two support arm drivers 90 are operable to change the common angle W by pivoting the two proximal support arms 56a about their respective support arm pivot pins 68, and the remaining support arms 56 are constrained to pivot together by the rod linkages 62. As the support arms 56 are pivoted together about support arm pivot pins 68, the common angle W changes but remains common to all the support arms 56. As a result, the forming rolls 54 are constrained to be a common variable rolling radius from the axis of rotation 28. The common variable rolling radius is shown as $R_v$ in FIG. 7.

The core 22 is supported by a core mount 21, which is operable to rotate the core 22 about the axis of rotation 28. In the position shown in FIGS. 3 to 5, the core 22 as well as a surrounding layer of a selected curable material 24 occupy a cylindrical rolling space defined by the forming rolls 54 to have a radius substantially equal to the common variable rolling radius $R_v$, less the radius of the forming rolls 54. The core 21 is also pivotable about a pivot axis 30 perpendicular to the axis of rotation 28, and outside the cylindrical rolling space, such that the core 22 can be pivoted into and out of the cylindrical rolling space.

FIGS. 3, 4, and 5 show the roll forming apparatus 50 in different positions, in which the common variable rolling radius $R_v$, is changed to define a cylindrical rolling space of varying dimensions. In FIG. 3, the common variable rolling radius $R_v$ of the forming rolls 54 from the axis of rotation 68 is maximized. In this position, the forming rolls 54 at the ends of the distal support arms 56c are spaced from one another at a maximum distance, thereby defining a gap 86 through which the core 22 can be pivoted into or out of the cylindrical rolling space in which the core 22 is centered around the axis of rotation 28.

In FIG. 4, the roll forming apparatus 50 is shown with the support arms 56 pivoted about their respective support arm pivot pins 68 by the support arm drivers 90 and the rod linkages 62, to reduce the common variable rolling radius $R_v$, and the dimensions of the cylindrical rolling space. The dimensions of the gap 86 are similarly reduced such that the core 22 and the surrounding layer of selected curable material 24 will not fit through the gap. In FIG. 5, the roll forming apparatus 50 is shown with the support arms 56 pivoted about their respective support arm pivot pins 68 by the support arm drivers 90 and the rod linkages 62, to reduce the common variable rolling radius and the dimensions of the cylindrical rolling space still further, such that the forming rolls 54 overlap. The features of the forming rolls 54 that permit the forming rolls to overlap are shown in FIG. 6.

FIG. 6 shows a sectional view of a forming roll 54. The forming roll 54 comprises a small diameter portion 60 and a large diameter portion 58. The large diameter portion 58 is secured to the small diameter portion 60 by a radial portion 59. The large diameter portion 58 extends no more than halfway across the total width provided by the forming roll 54, while the small diameter portion 58 extends across the entire width of the forming roll 54, but is partially covered by the large diameter portion 60.

Forming rolls 54 that are adjacent have an opposite configuration in that the large diameter portions 58 of adjacent forming rolls 54 are offset from each other so that adjacent forming rolls 54 can overlap. Specifically, the forming rolls 54 supported by the proximal support arm 56a and the distal support arm 56c of one group of support arms 56 has the same configuration as the forming roll 54 supported by the intermediate support arm 56b of the other group of support arms 56. The remaining three support arms have the opposite configuration. Thus, the two forming rolls 54 at the ends of the two distal support arms 56c are oppositely configured, such that the large diameter portion 58 of the forming roll 54 mounted on the end of one of the distal support arms 56c is aligned with the small diameter portion 60 of the forming roll 54 mounted on the end of the other distal support arm 56c. As a consequence of this configuration of the forming rolls 54, the forming rolls 54 are not prevented from being positioned close to one another by their large diameter portions 58 as these large diameter portions 58 can overlap, which permits greater reduction of the common variable rolling radius as shown in FIG. 5, thereby permitting smaller diameter insulating product to be formed. Preferably, the forming rolls 54 are made of nickel-plated aluminum in order to maximize rolling hardness while minimizing weight.

The fact that the forming rolls 54 can overlap permits larger diameter forming rolls 54 to be used for rolling smaller diameter insulation product then would otherwise be possible. Larger diameter forming rolls 54 are preferable to smaller diameter forming rolls as smaller diameter forming rolls provide a correspondingly smaller area of contact with the selected curable material 24. If equal force is provided to the selected curable material 24 through smaller forming rolls, this increases the pressure placed on the selected curable material 24, which, in turn, increases the likelihood of fibre damage.

Each of the forming rolls 54 has a coaxial drive sprocket 55 that engages a roller chain 84 to permit the forming rolls 54 to be driven by the roller chain 84. The roller chain 84 extends around a path defined by idler sprockets 82 and drive sprockets 88 as well as by the coaxial drive sprockets 55 of the forming rolls 54. At least one of the idler sprockets 82 is coupled to a tension weight 80 that takes up the slack of the roller chain 84 when the forming rolls 54 are pivoted inwardly as shown in FIG. 5.

Selected curable material 24 is supplied to the core 22 by an inclined conveyor 74. The inclination of the inclined conveyor 74 is controlled by a conveyor servo-driver 78 (shown in FIG. 4) that automatically controls the inclination of the inclined conveyor 74 to discharge the selected curable material 24 off a discharge end 76 of the inclined conveyor 74 and onto the core 22 and any selected curable material 24 previously deposited onto the core 22. The rate at which selected curable material 24 is supplied to the inclined conveyor 74 and from there to the core 22 is controlled by a weighing conveyor 70. The rotational speed of the core 22 is controlled by the servomotor 44 (shown in FIG. 1), and is based on the weight of the selected curable material as measured by the weighing conveyor 70. The rotation speed of the core 22 is a function of the feed rate of the selected curable material 24 from the inclined conveyor 74 and also of the current diameter of the selected curable material 24 formed around the core 22.

As the radial positioning of the forming rolls 54 is not a function of the current combined diameter of the core 22 and the selected curable material 24 being formed on the core 22, the forming rolls 54 can be advanced or retracted relative to the current depth of the selected curable material 24 on the core 22. Advancing the forming rolls 54 to increase the forming space will reduce compression of the selected curable material 24. Retracting the forming rolls 54 to decrease the forming space will compress the selected curable material 24 as the forming rolls 54 put more pressure on the selected curable material 24.

As the inclination of the inclined conveyor 74, the rate at which the selected curable material 24 is supplied by the inclined conveyor 74, the core rotation speed, and forming roll 54 rotational speed can all be integrally and precisely controlled, a high degree of control over the forming of the insulation product is possible. Specifically, given a large ratio of outside diameter of the insulation product to inside diameter of the insulation product, the heat flux at the inside annulus will be much greater than at the outer circumference. Accordingly, having a higher density at the internal core and a lower density at the outer diameter will provide a higher thermal resistance per unit area than at the circumference, providing an optimal overall thermal performance for given total mass of insulation. In order to increase the density of the insulation product at the inner annulus, the rotational speed of the core 22 can be reduced relative to the rate at which selected curable material 24 is deposited on the core 22, resulting in more selected curable material 24 being deposited per unit area. Then the cylindrical rolling space can be reduced to compress the selected curable material 24, while the rotational speed of the forming rolls 54 is reduced to accommodate the slower rotation of the core 22. Accordingly, the fact that all of the foregoing feed characteristic and rotational speeds can be precisely and integrally controlled, permits a superior product to be obtained.

Referring to FIG. 8, there is illustrated a curing oven 110 of a pipe insulation making apparatus in accordance with a preferred embodiment of the invention. The curing oven 110 is operable to cure the selected curable material 24 wrapped around the core 22 as shown in FIGS. 1 and 2. Curing oven 110 comprises a rear opening (not shown), which is opened and closed by an end door 116, and a main opening (not shown) that is opened and closed by a main door 118.

The curing oven 110 is disposed adjacent to the core support 21 at the side of the curing oven 110 that includes the rear opening and the rear door 116. In operation, when the main door 118 and the rear door 116 are opened, the core support 21 is operable to pivot the core 22 into the curing oven 110. The sealing plate 39 of the core support 21 is arranged to be identical in size to the end door 116 so that it closes and seals the rear opening when the core 22 is pivoted into the curing oven 110. The curing oven can then be sealed shut by closing the main door 118 using main door cylinders 126 to close the main door 118, and main door clamps 128 to clamp the main door 118 shut. A seal is maintained by a main door seal 130 when the main door 118 is shut and clamped by main door cylinders 126 and main door clamps 128 respectively. A top seal actuated by an air cylinder 122 is brought to bear on the top surface of the sealing plate 39 of the core support 21. In the same way, an end seal operated by cylinders 120, and a bottom seal actuated by cylinder 124 complete the sealing of the rear opening by the rear door 116 or the sealing plate 39 of the core support 21.

When the core 22 is sealed inside the curing oven 110, curing air, which has been heated to above a curing temperature for the selected curable material 24, is directed into the oven 110 via the curing inlet 112. Referring to FIGS. 9 and 10, curing air from the oven inlet 112 is first received into a louvered air distribution chamber 132. The louvered distribution chamber 132 has an elongated slot 134 along the length of a roof 113 of the curing oven 110 adjacent to the main door 118. The elongated slot 134 distributes the curing air along the length of the core 22 and the selected curable material 24 wrapped around the core 22. The oven outlet 114 is also disposed on the roof 113 of the curing oven 110 but is disposed towards the back side of the oven 110. The placement of the oven outlet 114 and the elongated slot 134 of the louvered air distribution chamber 132 on opposite sides of the roof of the curing oven induces a rotary curing airflow around the core 22 in the curing oven 110. The airflow rotates around the core 22 in the same direction as the core 22 did when the selected curable material 24 was being wrapped around the core 22. This rotation of the airflow tightens, rather than loosens, the spooling of the wound selected curable material 24 on the core 22.

The fact that the oven 110 is sealed enables a positive pressure to be built up within the oven 110. At the same time, as described above in connection with the description of the core 22, a partial vacuum is maintained within the core 22 by airflow through the vacuum conduit 32 and vacuum exhaust duct 34. The combination of the positive pressure within the oven 110 and the partial vacuum within the core 22, generates a significant hot or curing air static pressure across the selected curable material 24 wrapped around the core 22. The resulting flow of curing air through the selected curable material 24 and the perforations 26 of the core 22 maintain the selected curable material 24 in the compressed configuration effected during forming by preventing expansion of the selected curable material 24 and also provides effective heat transfer due to the velocity of hot air passing through the selected curable material 24. The compression of the selected curable material 24 under vacuum is maintained until the selected curable material 24 is cured, in order to maintain the desired compression. The oven 110 is kept as small as possible while still accommodating the core 22 and the selected curable material 24 wrapped therearound, in order to permit the selected curable material 24 to be cured as rapidly as possible.

By closing end door 116 and main door 118, the curing oven 110 can be preheated prior to receiving the core 22. Once the oven 110 has been preheated, a bypass valve 172 can be switched in conjunction with a hot air supply valve 170 and an oven pre-heat return valve 176 being closed to allow the air to bypass the oven 110 entirely. This allows the end door 116 and the main door 118 of the oven 110 to be opened and for the core support 21 to pivot the core 22 into the curing position within the oven 110, at which point the main door 118 of the curing oven 110 can be closed to seal the core 22 within the oven 110. The sealing plate 39 of the core support 21 seals the rear opening of the oven 110 shut.

The above-described structure of the oven 110 also permits self-cleaning. In order for the oven 110 to self-clean, an empty core moves into the oven 110 and hot air that is heated to above the normal operating temperature is ducted into the curing oven 110 via the oven inlet 112 and the elongated slot 134 of the louvered air distribution chamber 132. This high temperature cleans the interior of the oven 110 and the ducts without requiring the ducts to be dismantled, thereby improving the availability and economics of the apparatus.

Referring to FIG. 11, there is illustrated a preferred layout of a pipe insulation making apparatus in accordance with a preferred embodiment of the invention. As shown in FIG. 11, the pipe insulation making apparatus according to the preferred layout includes two cores 22 and two ovens 110. Each of the two cores 22 is supported by separate core supports 21. The core supports 21 pivot the cores 22 from a single forming position, designated 22a in FIG. 11, in which the selected curable material around each of the two cores 22 is formed by the roll forming apparatus 50 at different times. The core supports 21 are spaced on each side of the forming station. After forming, each core 22 is pivoted 180 degrees, through an intermediate position at 90 degrees designated 22b in the drawings, to a curing position 22c within the curing ovens 110.

Figure 12:
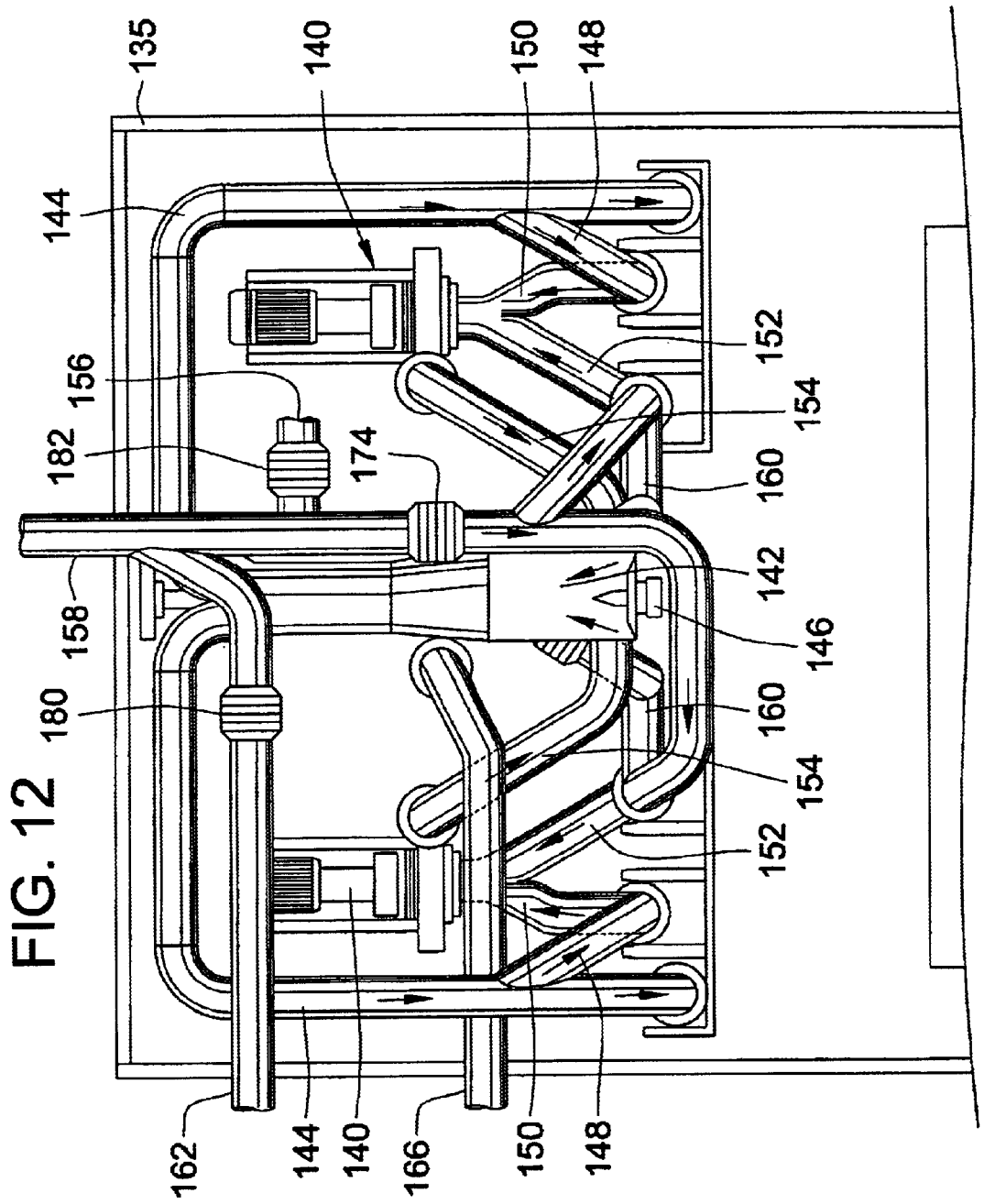
Figure 13:
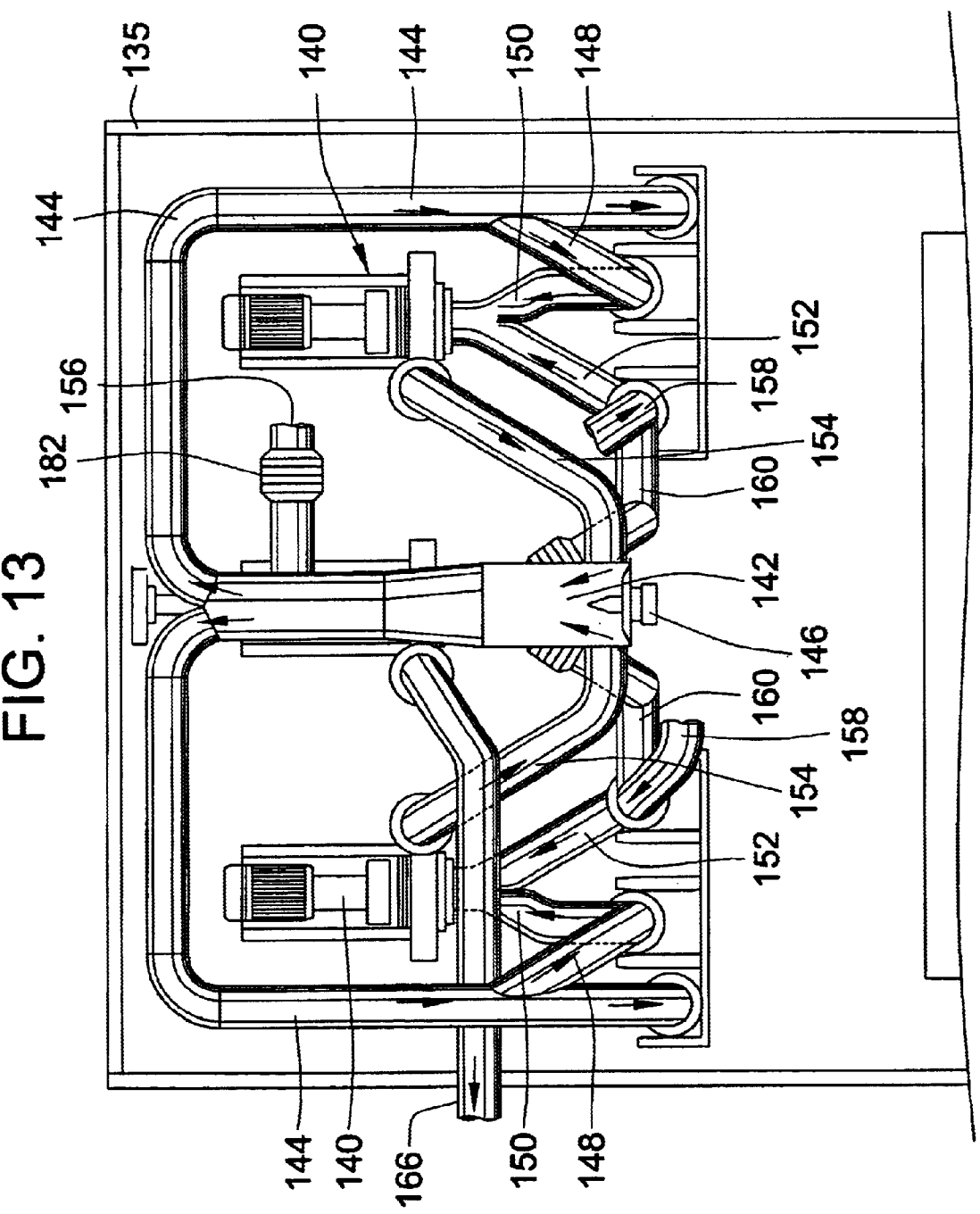

Referring to FIGS. 12 to 15, there are illustrated different portions of a duct system of a pipe insulation making apparatus in accordance with a preferred embodiment of the invention. The duct system is operable to provide forming airflow to both of the vacuum cores 22 during forming, and to provide curing airflow to both of the ovens 110 and both of the cores 22 during curing in accordance with the preferred embodiment of the invention. FIGS. 12 and 13 in different cut-away plan views, illustrate mainly those portions of the duct system 135 that provide the curing airflow to the ovens 110 and the cores 22 during curing. FIG. 14, in a further cut-away plan view, illustrates mainly those portions of the duct system 135 that draw the forming airflow from the cores 22 during forming. FIG. 15 is a cut-away perspective view of the duct system.

Each of the core supports is adjacent to a different curing oven 110; each curing oven 110 is positioned to be on the opposite side of the adjacent core support 21 from the forming station. When the selected curable material 24 has been fully formed at the forming station, the core support 21 pivots the core 22 through 180° C. and into the adjacent oven 110, at which point the sealing plate 39 of the core support 21 will seal the end opening of the adjacent oven 110. The main door 118 then closes to seal the core 22 and the formed selected curable material 24 wrapped around the core 22 into the curing oven 110 for curing. The forming station is then free for the other core 22 to be pivoted into position in the forming station to receive and form new selected curable material 24.

The partial vacuum within each core 22 and the positive pressure within each oven 110 during curing are maintained by hot air recirculation fans 140. The hot air recirculation fans 140 force hot curing air into the combustion box 142 via recirculation outlet lines 154. In the combustion box 142, the hot curing air is heated to a temperature above the curing temperature for the selected curable material 24. The positive pressure generated by the hot air recirculation fan 140 forces the heated curing air out of the combustion box 142 and into the hot air recirculation lines 144. Each of the hot air recirculation lines 144 communicates with different oven inlets 112 such that heated curing air is discharged into each oven 110 via its oven inlet 112, louvered air distribution chamber 132, and elongated slot 134. A minimal amount of curing air is discharged from each oven 110 into oven hot air outlet lines 150. A partial vacuum is maintained in oven hot air outlet lines 150 by the hot air recirculation fans 140 in order to draw some small portion of the curing air out of the ovens 110 and into the oven hot air outlet lines 150. The oven hot air outlet lines 150 are connected to the hot air recirculation fans 140 such that the curing air from the oven hot air outlet lines 150 is redirected to the combustion box 142 via the hot air recirculation fans 140 and the recirculation outlet lines 154. Most of the heated curing air that is released into each oven 110 via its oven inlet 112 is drawn through the selected curable material 24 and into the cores 22 via the perforations 26. The spent curing air within the cores 22 is then drawn back to the recirculation fans via turret outlet lines 152. The hot air recirculation lines 154 then channel this air, together with the curing air received from the oven hot air outlet lines 150, back to the combustion box 142.

As described above in connection with the description of the curing oven 110 shown in FIG. 8, duct system 135 includes a bypass valve 172 for each curing oven 110 for redirecting all the heated curing air in the hot air recirculation lines 144 into oven hot air outlet lines 150 via oven bypass lines 148, without this curing air passing through the ovens 110, when each core 22 is being pivoted into its oven 110 after preheating of the oven 110. To facilitate this, the hot air supply valves 170 in the hot air recirculation lines 144 and the oven pre-heat return valves 176 in the hot air outlet lines 150 are also closed. The bypass valves 172 will remain partially open during the cure cycle to maximize the fan static pressure built up within the ovens 110.

After the selected curable material 24 has been cured, it must be cooled. Preferably, air that has been used to cool the selected curable material 24 after curing is used as input air into the ducting system 135 in order to retain the heat absorbed by this cooling air during cooling of the selected curable material 24. Referring to FIGS. 13 and 15, cooler air outlet line 158 communicates with both turret hot air outlet lines 150. Air from cooler air outlet line 158 is drawn back to hot air recirculation fans 140. This air is then sent along with spent curing air to the combustion box 142 via the recirculation outlet lines 154 for heating and incineration removal of the smokes obtained from the selected curable material 24. The cooler air outlet line 158 has a cooler return valve 174 that is a variable valve and serves to limit the volume and maximize the heat recovery from the air flow from the cooler as well as permitting optimal incineration.

As shown in FIG. 12, a cooler discharge line 162 for discharging excess cooling air includes a cooler discharge valve 180. Preferably, cooling air that cannot be returned to the hot air recirculation system in the above-described manner, is filtered before discharge in order to remove the smokes obtained from the selected curable material 24 during curing. Exhaust from the combustion fuel used to maintain the temperature in combustion box 142 is discharged via exhaust stack line 156 through a variable exhaust valve 182 (shown in FIG. 12) that serves to optimize system pressure and flow.

Referring to FIGS. 14 and 15, the cold air duct work of the duct system 135 is illustrated. As shown in the plan view of FIG. 14, forming air fan 164 generates a partial vacuum in turret cold air outlet lines 160. Turret cold air lines 160 communicate with cores 22 via vacuum exhaust ducts 34 and vacuum ducts 32 to maintain a partial vacuum in the interior of the cores 22. Hot core suction valves 178 in turret hot air outlet lines 152 are closed and cold core suction valves 184 in turret cold air outlet lines 160 are open to direct the forming air flow into the cold air outlet lines 160.

Referring to FIG. 15, there is illustrated a cut-away perspective view of the duct system 135. The vacuum exhaust duct 34 of each of the two core supports 21 leads to a juncture of one turret hot air outlet line 152 and one turret cold air outlet line 160. During curing, the turret hot air outlet line 152 is connected to the vacuum exhaust duct 34, while during forming, the turret cold air outlet line 160 is connected to the vacuum exhaust duct 34. Turret cold air outlet line 160 leads to forming air fan 164, which provides the partial vacuum in turret cold air outlet 160, vacuum exhaust duct 34, vacuum duct 32 and the inside of core 22. From the forming air fan 164, the spent forming air is discharged through a cold air exhaust conduit 166 to a suitable filter system. The turret hot air outlet lines 152 lead to the hot air recirculation fans 140, as do the oven hot air outlet lines 150. From the hot air recirculation fans 140, curing air is redirected to the recirculation outlet lines 154 and from there to the combustion box 142 and the hot air recirculation line 144 as described above.

Other variations and modifications are possible. All such modifications or variations are believed to be within the scope of the invention as defined by the claims appended hereto.

What is claimed is:

1. An apparatus for receiving a selected curable material and for retaining the selected curable material during a forming stage and a curing stage, the selected curable material being formed into a desired configuration during the forming stage and being heated during the curing stage to harden the selected material in the desired configuration, the apparatus comprising:

a core mounted for rotation about an axis of rotation, the core having an associated core rotation means for rotating the core about an axis of rotation, an outer permeable surface for receiving and retaining the selected curable material, and fluid communication means for receiving air flow from the outer permeable surface;

a curing means for heating the selected curable material to at least a curing temperature to harden the selected curable material in the selected configuration, wherein the curing means includes a curing station for supplying a curing air supply around the core, and air heating means for heating the curing air supply to at least the curing temperature; and, the vacuum means includes a forming air outlet for receiving the forming core air flow from the fluid communication means, a recirculation outlet for receiving the curing core air flow from the fluid communication means and for recirculating the curing core air flow back to the curing station, and a valve means for controlling fluid communication between the forming air outlet and the fluid communication means and for controlling fluid communication between the recirculation outlet and the fluid communication means; and, a vacuum means in fluid communication with the fluid communications of the core for drawing a forming core air flow through the fluid communication means, the outer permeable surface of the core and the selected curable material retained on the core during forming of the selected curable material retained on the core, the forming core air flow having a temperature below the curing temperature, and drawing a curing core air flow through the outer permeable surface and the fluid communication means of the core and the selected curable material retained on the core during curing of the selected curable material retained on the core.

2. The apparatus as defined in claim 1 wherein the vacuum means includes an exhaust fan for discharging the forming core air flow via the forming air outlet; and, a recirculation fan for recirculating the curing core air flow to the curing station via the recirculation outlet.

3. The apparatus as defined in claim 1 wherein the valve means has an associated forming setting, the valve means in the associated forming setting being operable to connect the forming air outlet to the fluid communication means, and to disconnect the recirculation air outlet from the fluid communication means;

an associated curing setting, the valve means in the associated curing setting being operable to connect the recirculation air outlet to the fluid communication means, and to disconnect the forming air outlet from the fluid communication means; and, an associated distributed setting between the associated forming setting and the associated curing setting for providing continuous air flow through the core when the apparatus is changing from the forming stage to the curing stage, the valve means being operable to decrease fluid communication between the forming air outlet and the fluid communication means and to conjointly and proportionately increase fluid communication between the recirculation air outlet and the fluid communication means when the valve means is moving through the associated distributed setting from the associated forming setting to the associated curing setting.

4. The apparatus as defined in claim 3 further comprising a forming station for forming the selected curable material retained on the core into the selected configuration; and, a core support for supporting the core, the core support being pivotable about a pivot axis to pivot the core between the forming station and the curing station, the core support having a vacuum conduit for providing fluid communication from the fluid communication means of the core to the forming air outlet and the recirculation outlet, the valve means being operable to control fluid communication between the forming air outlet and the vacuum conduit and to control fluid communication between the recirculation outlet and the vacuum conduit.

5. The apparatus as defined in claim 4 wherein the curing station comprises a curing oven for receiving the core and for supplying the curing core air flow to the core, the core support being operable to pivot the core into and out of the curing oven.

6. The apparatus as defined in claim 5 wherein the curing oven has a rear opening, a main opening and a main door for closing and opening the main opening, the main opening extending lengthwise along the curing oven and the core support being operable to pivot the core into and out of the curing oven core when the main door is open;

the core support is positioned beside the rear opening of the curing oven and has a sealing plate dimensioned to close and seal the rear opening of the curing oven when the core is pivoted into the curing oven when the main door of the oven is open, the main door being closeable when the core is in the oven to seal the core and the selected material retained thereon in the oven for curing.

7. The apparatus as defined in claim 6 wherein the curing oven comprises a curing air inlet for discharging the curing air supply into the curing oven, the curing air inlet being in fluid communication with the recirculation outlet; and the air heating means is between the recirculation outlet and the curing air inlet to heat the curing air supply to at least the curing temperature.

8. The apparatus as defined in claim 7 wherein the curing oven includes a rear door for closing the rear opening, and the curing air inlet includes an associated bypass valve for disconnecting the curing air inlet from the curing oven and rerouting the curing air supply back to the air heating means.

9. The apparatus as defined in claim 7 wherein the curing oven includes an oven air outlet for drawing an oven air outflow from the curing oven and for inducing a rotational air flow of the curing air supply around the core in the curing oven, the oven air outlet being in fluid communication with the air heating means and the curing air inlet to recirculate the oven air outflow back to the curing air inlet after the oven air outflow has been reheated; and, the oven air outlet and the curing air inlet are located on a common side of the curing oven and are disposed on opposite sides of the core.

10. The apparatus as defined in claim 9 wherein the curing air inlet extends lengthwise along the common side and releases the curing air supply along substantially an entire length of the selected curable material retained on the core.

* * * * *